United States Patent [19]
Stein et al.

[11] Patent Number: 5,177,142
[45] Date of Patent: Jan. 5, 1993

[54] SILICONE RELEASE COATING COMPOSITIONS

[75] Inventors: Judith Stein, Schenectady; Kevin X. Lettko, Troy, both of N.Y.

[73] Assignee: General Electric Company, Schenectady, N.Y.

[21] Appl. No.: 748,595

[22] Filed: Aug. 22, 1991

[51] Int. Cl.$^5$ .......................... C08L 83/04; C08K 5/13
[52] U.S. Cl. .................................... 524/740; 524/860; 524/862
[58] Field of Search .................. 524/740, 862, 860

[56] References Cited

U.S. PATENT DOCUMENTS

| | | | |
|---|---|---|---|
| 4,830,924 | 3/1989 | Dallavia, Jr. | 524/862 |
| 4,879,339 | 11/1989 | Yoshino et al. | 524/740 |
| 4,935,455 | 6/1990 | Huy et al. | 524/860 |

*Primary Examiner*—Melvyn I. Marquis
*Assistant Examiner*—Karen A. Dean
*Attorney, Agent, or Firm*—William H. Pittman

[57] ABSTRACT

"Acrylic weld" of a silicone release composition comprising a polydiorganosiloxane containing unsaturated groups, a crosslinking agent containing Si—H groups and a hydrosilation catalyst is inhibited by incorporating therein at least one free radical inhibitor. The preferred inhibitors are alkoxyphenols, especially 4-methoxyphenol.

15 Claims, No Drawings

SILICONE RELEASE COATING COMPOSITIONS

This invention relates to silicone release compositions, and more particularly to compositions having a reduced tendency to bond to acrylic adhesives.

Silicone release compositions are normally employed to coat backing sheets for pressure-sensitive items such as labels. Upon application of the item to the backing sheet, a unitary article is produced which may be easily shipped and handled. The item may then be peeled off the backing sheet at the time of use and applied to a surface to which it adheres, whereupon the backing sheet is discarded.

The release compositions employed on backing sheets are often heat-curable compositions applied in the form of two constituents, an addition-curable diorganopolysiloxane and a siloxane crosslinking or curing agent having Si—H groups. Also present is a hydrosilation catalyst, typically a platinum compound or complex, which catalyzes an addition reaction between said constituents to form the release coating. Upon heating to an elevated temperature, a hydrosilation reaction occurs to form the release coating composition.

Silicone release coatings are typically employed with acrylic adhesives. It is frequently found, however, that there is a tendency of the release coating to bond strongly to the acrylic adhesive, particularly when the latter is contacted with the release coating before crosslinking is complete. The result is difficulty or impossibility of removal of the adhesive article from the backing sheet. This phenomenon is sometimes designated "acrylic weld".

Various solutions to the problem of acrylic weld have been suggested. For example, U.S. Pat. No. 4,609,574 discloses release coating compositions in which the addition-curable diorganopolysiloxane contains a substantial proportion of alkenyl groups higher than the vinyl group. U.S. Pat. No. 4,774,111 employs diorganofumarates as cure control agents to promote rapid and complete crosslinking before contact is effected with the acrylic adhesive. British patent 1,518,371 employs various other organic compounds as acrylic weld-inhibiting additives.

The present invention provides an alternative genus of silicone release coating compositions with a substantially reduced tendency to exhibit acrylic weld. Said compositions are relatively inexpensive, employing the normal constituents of release coatings in addition to additives which are readily available and of relatively low cost.

Accordingly, the invention in one of its aspects includes heat-curable silicone compositions comprising:

(A) an addition-curable diorganopolysiloxane having alkenyl functional groups in a proportion up to about 20% by weight and having a viscosity at 25° C. in the range of about 50–100,000 centipoise, (B) a crosslinking amount of a siloxane crosslinking agent having a substantial proportion of Si—H groups and having a viscosity at 25° C. up to about 1000 centipoise, (C) an amount effective to crosslink said diorganopolysiloxane of a hydrosilation catalyst, and (D) an amount of at least one free radical inhibitor effective to inhibit bonding of said coating composition to an acrylic adhesive.

Another aspect of the invention is cured (also sometimes designated "crosslinked") release coating compositions prepared by heating said curable compositions.

The addition-curable diorganopolysiloxanes employed as reagent A in the curable compositions of this invention are those conventionally employed in silicone release coatings. For the sake of brevity, they are frequently designated "vinyl silicone" hereinafter, but it should be understood that addition-curable groups other than the vinyl group may be present therein.

Typical vinyl silicones are of the types disclosed in U.S. Pat. Nos. 4,256,870 and 4,340,647, the disclosures of which are incorporated by reference herein. They comprise structural units of the formulas

and

wherein each $R^1$ is independently a monovalent hydrocarbon radical free from unsaturation and $R^2$ is a hydrocarbon radical having alkenyl unsaturation, ordinarily in combination with end groups having the formula

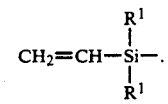

The $R^1$ radicals are typically alkyl such as methyl, ethyl, propyl or butyl, with methyl frequently being preferred. The $R^2$ radicals are most often vinyl but may also by allyl, butenyl, cyclohexenyl or the like.

The proportion of alkenyl functional groups in the vinyl silicone is up to about 20% by weight. Its viscosity at 25° C. is in the range of about 50–100,000 centipoise.

Also present in the curable compositions of this invention, as reagent B, is a crosslinking amount of a siloxane crosslinking agent having a substantial proportion, typically about 10–100% based on silicon atoms, of Si—H groups. Such compounds include monomeric compounds such as trimethylsilane as well as polymeric compounds such as mono-trimethylsilyl-terminated polydimethylsiloxane. The viscosity of the crosslinking agent at 25° C. is up to about 1000 centipoise and preferably in the range of about 25–1000 centipoise.

The hydrosilation catalysts employed as reagent C in the curable compositions of this invention are also known materials. Numerous examples are disclosed in the aforementioned U.S. Pat. Nos. 4,256,870 and 4,340,647. Platinum-containing catalysts are usually preferred, although compounds of ruthenium, rhodium, palladium, osmium and iridium may also be employed. Particularly preferred in many instances are the complexes of chloroplatinic acid and divinyltetramethyldisiloxane.

An essential feature of the invention is the presence in the curable composition of at least one free radical inhibitor (component D), in an amount effective to inhibit bonding of the release composition to an acrylic adhesive. Any free radical inhibitor which is compatible with the silicone release coating may be employed. These include quinones, hindered phenols, amines and alkoxyphenols in combination with at least trace amounts of molecular oxygen, and also compounds containing an N—O bond such as nitrophenol, hydroxylamine and nitrogen oxides.

Preferred inhibitors, by reason of their solubility in the silicones employed in the release coatings, are alkoxyphenols in combination with oxygen (e.g., as air in contact with the composition). Of these, 4-methoxyphenol is especially preferred owing to its effectiveness and relatively low cost.

The curable compositions of this invention most often contain about 1-10 parts by weight of crosslinking agent per 100 parts of vinyl silicone and about 0.1-2.0% by weight of free radical inhibitor, based on the total of reagents A and B. The hydrosilation catalyst is typically present in the amount of about 50-100 ppm. of metal such as platinum, based on the total of reagents A and B.

Said compositions may also contain other materials whose use in such compositions is conventional. Among these are cure control additives, illustrated by dialkyl maleates such as dimethyl maleate and the aforementioned fumarates.

In ordinary use, the curable compositions of this invention are prepared by combining the constituents thereof and are then coated onto paper by conventional methods. They may then be cured by heating at a temperature in the range of about 100°-200° C. to form a backing sheet coated with a silicone release composition, which may be subsequently contacted with a sheet coated with a conventional acrylic adhesive. More often, however, the acrylic adhesive is coated directly on the cured release composition, after which a second sheet is applied to the acrylic layer and the assembly pressed together.

The precise function of the free radical inhibitor in the curable compositions of this invention is not known with certainty. It is believed, however, that it may inhibit further polymerization of a partly polymerized acrylic composition employed as the adhesive, or perhaps a free radical-initiated reaction of the unsaturated moieties in said acrylic adhesive with the crosslinking agent or with the vinyl silicone. In any event, the silicone release compositions of this invention require substantially less force for release from an adhesive layer than identical compositions not containing the inhibitor.

The invention is illustrated with reference to a curable composition prepared by mixing the following ingredients, all proportions being by weight:

(A) 100 parts of a vinyl-substituted polydimethylsiloxane having a number average molecular weight of about 12,000 as determined by gel permeation chromatography relative to polystyrene, having a viscosity in the range of 300-600 centipoise and containing both terminal and internal vinyl groups with a total of about 5 vinyl groups per molecule;
(B) 4 parts of a polydimethylsiloxane having an average of 40 Si—H moieties per molecule and a viscosity of at most 1000 centipoise;
(C) 75 ppm. (based on reagent A) of platinum in the form of a chloroplatinic acid-divinyltetramethyldisiloxane complex.
(D) 0.5% (based on the total of components A and B) of 4-methoxyphenol.

Also present was 1%, based on the total of components A and B, of dimethyl maleate as a cure control additive.

After mixing, the composition was coated onto 19.1-kg. super calendered kraft paper to give a coating weight of about 0.27 kg./ream. Curing was effected at a temperature of about 150° C., employing a dwell time of about 12 seconds. A commercially available acrylic adhesive was then applied to the silicone release coating to a wet thickness of 3 mil, using a roll coater. The adhesive-coated sheet was heated at 70° C. for 15 minutes to drive off solvent; it was then cooled to room temperature over ½ hour and a sheet of paper stock was applied thereto and laminated by rolling at 6.3 kg./cm.$^2$.

Release testing was performed by cutting the laminates into 5-cm. strips and pulling the silicone lamina from the adhesive lamina at 762 cm./min. and an angle of 180°, using a TMLI peel tester, in comparison with a control material containing no 4-methoxyphenol. After storage for one day, the composition of this invention exhibited a release force of 123 grams, as compared to 423 grams for the control. After one week, the composition of this invention exhibited a release force of 139 grams while the control did not release, showing total weld between the release coating and the adhesive.

What is claimed is:

1. A curable coating composition comprising:
   (A) an addition-curable diorganopolysiloxane having alkenyl functional groups in a proportion up to about 20% by weight and having a viscosity at 25° C. in the range of about 50-100,000 centipoise,
   (B) a crosslinking amount of a siloxane crosslinking agent having a substantial proportion of Si—H groups and having a viscosity at 25° C. up to about 1000 centipoise,
   (C) an amount effective to crosslink said diorganopolysiloxane of a hydrosilation catalyst, and
   (D) an amount of 4-methoxyphenol in combination with oxygen effective to inhibit bonding of said coating composition to an acrylic adhesive.

2. A composition according to claim 1 wherein component A comprises structural units of the formulas

and

wherein each $R^1$ is independently a monovalent hydrocarbon radical free from unsaturation and $R^2$ is a hydrocarbon radical having alkenyl unsaturation.

3. A composition according to claim 2 wherein component A consists essentially of divalent dimethylsiloxy groups, divalent vinylmethylsiloxy groups and vinyldimethylsiloxy end groups.

4. A composition according to claim 2 wherein component B is a polydimethylsiloxane having about 10-100% Si—H groups, based on silicon atoms.

5. A composition according to claim 4 which comprises about 1-10 parts by weight of reagent B per 100 parts of reagent A.

6. A composition according to claim 2 wherein reagent C is a platinum-containing catalyst.

7. A composition according to claim 6 which contains reagent C in the amount of about 50–100 ppm. of metal based on the total of reagents A and B.

8. A composition according to claim 7 wherein reagent C is a complex of chloroplatinic acid and divinyltetramethyldisiloxane.

9. A composition according to claim 2 which contains about 0.1–2.0% by weight of component D based on the total of reagents A and B.

10. A cured release coating composition prepared by heating the composition of claim 1 at a temperature in the range of about 100°–200° C.

11. A cured release coating composition prepared by heating the composition of claim 2 at a temperature in the range of about 100°–200° C.

12. A cured release coating composition prepared by heating the composition of claim 4 at a temperature in the range of about 100°–200° C.

13. A cured release coating composition prepared by heating the composition of claim 7 at a temperature in the range of about 100°–200° C.

14. A cured release coating composition prepared by heating the composition of claim 8 at a temperature in the range of about 100°–200° C.

15. A cured release coating composition prepared by heating the composition of claim 9 at a temperature in the range of about 100°–200° C.

* * * * *